United States Patent
Miyamoto et al.

(10) Patent No.: US 7,522,509 B2
(45) Date of Patent: Apr. 21, 2009

(54) SEMICONDUCTOR LASER DRIVING DEVICE AND OPTICAL DISC DEVICE

(75) Inventors: Takashi Miyamoto, Saitama (JP); Tomohisa Inaba, Saitama (JP); Kiyoshi Shidara, Saitama (JP)

(73) Assignee: TEAC Corporation, Tama-shi, Tokyo (JP)

( * ) Notice: Subject to any disclaimer, the term of this patent is extended or adjusted under 35 U.S.C. 154(b) by 591 days.

(21) Appl. No.: 10/851,472

(22) Filed: May 20, 2004

(65) Prior Publication Data

US 2005/0013228 A1    Jan. 20, 2005
US 2007/0195671 A2    Aug. 23, 2007

(30) Foreign Application Priority Data

May 21, 2003    (JP)  .............................. 2003-143504

(51) Int. Cl.
     *G11B 7/00*    (2006.01)
(52) U.S. Cl. ........................ 369/116; 369/47.5; 369/120
(58) Field of Classification Search ................. 369/116, 369/47.5, 47.51, 120, 121, 122, 47.55, 47.52, 369/47.53, 53.37
See application file for complete search history.

(56) References Cited

U.S. PATENT DOCUMENTS 5,745,463 A * 4/1998 Maegawa et al. ......... 369/59.14
7,061,844 B2 * 6/2006 Seo ........................... 369/53.26
7,177,253 B2 * 2/2007 Ishibashi et al. ......... 369/53.27

FOREIGN PATENT DOCUMENTS

| JP | 08-190725 | 7/1996 |
| JP | 2000-207742 A | 7/2000 |
| JP | 2002-42340 A | 2/2002 |
| JP | 2002-151788 A | 5/2002 |
| JP | 2002-279633 A | 9/2002 |

* cited by examiner

*Primary Examiner*—Nabil Z Hindi
(74) *Attorney, Agent, or Firm*—Christensen O'Connor Johnson Kindness PLLC

(57) ABSTRACT

In an optical disc device, the recording laser light power from a semiconductor laser is adjusted to a desired power. A front monitor PD is provided near the semiconductor laser LD of an optical pickup 16, and the recording layer light power is detected. A system controller 32 stores in memory an approximating equation for a correction coefficient for the recording power based on the detection signal characteristic when the recording laser light is a multi-pulse signal, uses the approximating equation to compute the correction coefficient for the desired recording power, corrects the detected signal level from the front monitor PD, and executes feedback control of the laser power emitted from the LD.

6 Claims, 5 Drawing Sheets

SEMICONDUCTOR LASER DRIVING DEVICE AND OPTICAL DISC DEVICE

BACKGROUND OF THE INVENTION

1. Field of the Invention

This invention relates to a semiconductor laser driving device and optical disc device, and in particular relates to a semiconductor laser device capable of adjusting the laser optical power from the semiconductor laser, and an optical disc device using this semiconductor laser device.

2. Description of the Related Art

Semiconductor laser LDs for recording and reproduction are mounted in conventional CD drives, DVD drives, and other optical disc devices, and the power and pulse width of the laser light emitted from the semiconductor laser are adjusted. With respect to laser light power in particular, a photodiode PD is positioned near the LD to receive laser light from the LD and detect the power, and an APC (auto-power control circuit) is used to drive the LD so as to coincide with a target value.

On the other hand, in DVD-R drives, DVD-RW drives and similar, data is recorded using multi-pulse recording. That is, there exist 3T to 11T and 14T recording data marks (where T is the basic data length), and the shortest data mark 3T is recorded using a single pulse, but 4T and longer data marks are recorded using multi-pulse recording by a leading pulse and a following pulse succeeding this.

An example of a multi-pulse signal is shown in FIG. 6. Read power (reproduction power) is superposed on level 0, and write power (recording power) is further superposed on the read power; the write power is formed from the leading pulse and a following pulse. By irradiating the DVD-R disc or similar with such multi-pulse laser light, pits are formed on the DVD-R recording film (for example, an organic dye film). In the figure, pit widths are determined according to the pulse widths of the multi-pulse signal, but in actuality, because there is thermal diffusion in the recording film, the pit widths are somewhat larger or smaller. Also, in the figure the leading pulse has a constant write power, but in order to make the recording edge sharper, the rising portion of the leading pulse is boosted above the write power.

Conventionally, when performing data recording using multi-pulse signals, the average value of a signal from the PD and the target value thereof are compared in feedback control of the LD power; a technique has been proposed to correct one of the average value and the target value according to the change in the pulse duty ratio (see for example Japanese Laid-open Patent Application No. 2002-57403). In the description of this patent document, when for a pit length to be recorded the pulse duty changes from 50% to 40%, by subtracting a predetermined amount from the average value output from a low-pass filter or adding a predetermined amount to the target value, the write power is maintained at the target value. This correction amount is either computed by a CPU, or can be determined from a table.

SUMMARY OF THE INVENTION

However, in the case of multi-pulse recording the output waveform from the PD is blunted compared with the actual waveform, due to the time constant, slew rate, and similar of the PD IC and amplifier in addition to changes in the duty ratio, and so has an effect as an error in power detection of the following pulse. Specifically, because the waveform is blunted, due to the effect of the leading pulse, the following pulse rises again to the write level before falling to the read power, resulting in a waveform close to a state in which the write power level persists. Hence the signal output from the PD must be corrected taking this blunting of the waveform into account. This applicant has confirmed that this persistence depends on the pulse width of the following pulse, and that the correction coefficient C for the signal output from the PD is substantially proportional to the pulse width Tmp of the following pulse.

FIG. 7 shows the relation between the pulse width Tmp of the following pulse at a write power of 10 mW, and the correction coefficient Cp for a signal output from PD. The figure is normalized such that the correction coefficient Cp is 1 when Tmp=0.75T. This is expressed as an equation as follows:

$$Cp = K \cdot C = a \cdot (Tmp - 0.75T) + 1 \quad (1)$$

where K is a normalization coefficient and a is the slope of the correction coefficient. This applicant has found experimentally that if the write power is different, the correction coefficient Cp changes even when Tmp is the same, and also found that the write power and the correction coefficient are not proportionally related. This signifies that a write power and the slope a of the correction coefficient for Tmp at that write power are not proportionally related.

FIG. 8 shows the relation, discovered experimentally, between the write power and the slope a of the correction coefficient Cp. It is preferable to experimentally determine the correspondence between the write power and slope a and to record the results in a table; and then to determine the correction coefficient Cp corresponding to the target write power using this table. However, considering available memory capacity, the correspondence relation can only be recorded for a limited number of data items, and so there has been the problem that linear interpolation or similar must be used to compute the correction coefficient Cp, resulting in deterioration of correction precision.

An object of this invention is, in light of the above problem, to provide a device capable of precisely adjusting the LD laser power, and an optical disc device including this device.

This invention is a semiconductor laser driving device having light-receiving means to detect recording laser light from a semiconductor laser, and control means to compare a signal from the light-receiving means to a target value and control driving of the semiconductor laser such that the signal coincides with the target value, in which correction means to correct the signal level from the light-receiving means is further included, wherein the correction means performs correction by multiplying the signal level from the light-receiving means or the target value by a correction coefficient, and uses an approximating equation to compute the correction coefficient according to the target recording power. The signal level from the light-receiving means, that is, the power level of recording laser light emitted from the semiconductor laser, is corrected by the correction means and compared with the target value. Correction by the correction means is performed by multiplying the signal level from the light-receiving means, for example a voltage signal value, by the correction coefficient; accordingly, the error component contained in the signal level from the light-receiving means is suppressed or canceled, and comparison with the target value is performed. In this invention, the error component is the deviation from the true detection level, arising from time constants and other parameters of the detection system (including the light-receiving means) for detecting the power of the recording laser light from the semiconductor laser, and in particular is the disorder in the detected waveform due to interaction between pulses when multi-pulse recording laser light is used. In this invention, an approximating equation computed using a certain method is employed to compute the correction coefficient and correct the signal level.

In one aspect of this invention, the above correction coefficient is taken to be substantially proportional to the pulse width when the semiconductor laser light consists of a pulse train, and in the above approximating equation the proportionality constant for the above target recording power is given in a nonlinear form.

In one aspect of this invention, the above recording laser light is superposed on reproduction laser light; the above approximating equation takes the reproduction power of the above reproduction laser light and the detected energy when the above reproduction light is received by the light-receiving means as known constants; and takes as constant values the detected energy when the above recording laser light is received by the light-receiving means in cases where the above pulse width is smaller than a predetermined value, and the constant of proportionality to the recording power of the detected energy when the recording laser light is received by the light-receiving means in cases where the pulse width is equal to or greater than a predetermined value.

A semiconductor laser driving device of this invention can be applied to a wide range of optical disc devices, such as DVD-R drives, DVD+R drives, DVD-RW drives, DVD+RW drives, DVD-RAM drives and so on.

DESCRIPTION OF THE PREFERRED EMBODIMENTS

Hereinafter, embodiments of this invention will be explained with reference to the drawings.

Figure 1:
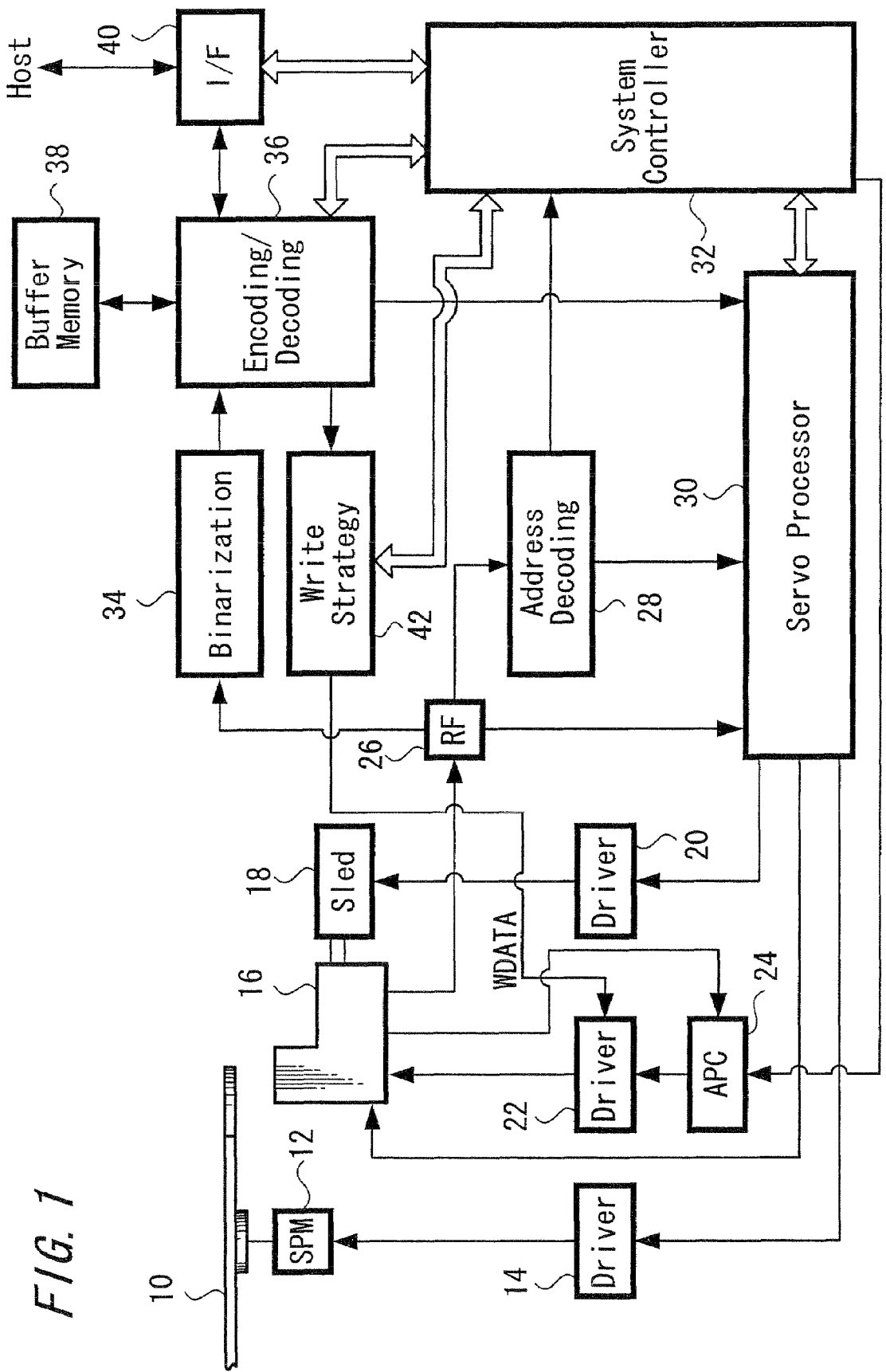
FIG. 1 is a block diagram of the configuration of an embodiment of this invention.

FIG. 1 shows the overall configuration of an optical disc device of the embodiment of the present invention. An optical disc 10 capable of DVD-R, DVD+R, DVD-RW, DVD+RW, DVD-RAM, or similar data recording is driven to rotate by a spindle motor (SPM) 12. The spindle motor (SPM) 12 is driven by a driver 14, and the driver 14 is subjected to servo control by a servo processor 30 so as to have a desired rotation speed.

The optical pickup 16 positioned opposing the optical disc 10 includes: a LD used to irradiate the optical disc 10 with laser light, a four-segment PD which receives light reflected from the optical disc 10 and converts the light into an electrical signal, and a front-monitor PD which detects the power of laser light from the LD. The optical pickup 16 is driven in the radial direction of the optical disc 10 by a sled motor 18, and the sled motor 18 is driven by the driver 20. The driver 20 is subjected to servo control by the servo processor 30, similarly to the driver 14. The LD of the optical pickup 16 is driven by the driver 22, and the driver 22 is controlled by an APC 24 such that the driving current is at a desired value. The APC 24 controls the driving current of the driver 22 so as to coincide with the optimum write power selected by the OPC (Optimum Power Control) executed in the test area (PCA) of the optical disc 10. The OPC is a processing in which the recording power is changed to a plurality of stages to record test data in the PCA of the optical disc 10, the test data is reproduced to evaluate the signal quality, and the write power at which the desired signal quality is obtained is selected. In order to evaluate the signal quality, $\beta$ values and $\gamma$ values, the degree of modulation, jitter and similar are used.

First, operation is explained for a case in which data recorded on the optical disc 10 is reproduced. When reproducing data recorded on the optical disc 10, the disc is irradiated with laser light at the reproduction power from the LD of the optical pickup 16, and the reflected light is converted into an electrical signal and output by the PD. The reproduction signal from the optical pickup 16 is supplied to the RF circuit 26. The RF circuit 26 generates a focus error signal and tracking error signal from the reproduction signal, and those are supplied to the servo processor 30. The servo processor 30 executes servo control of the optical pickup 16 based on those error signals, to maintain the optical pickup 16 in the on-focus state and in the on-track state. The RF circuit 26 supplies the address signal contained in the reproduction signal to the address decoding circuit 28. The address decoding circuit 28 demodulates the address data of the optical disc 10 from the address signal, and supplies the result to the servo processor 30 and system controller 32.

In the case of a DVD-R or DVD-RW disc, address data can be obtained using the land pre-pit method. In the case of a DVD-RAM disc, address data exists in the header portion recorded in sectors, and the address data can be obtained using the CAPA (Complimentary Allocated Pit Addressing) method. The RF circuit 26 supplies the reproduction RF signal to the binarizing circuit 34. The binarizing circuit 34 converts the reproduction signal into a binary value, and supplies the resulting signal to the encoding/decoding circuit 36. In the encoding/decoding circuit 36, the binarized signal is subjected to demodulation and error correction to obtain the reproduced data, and the reproduced data is output to the personal computer or other host device via the interface I/F 40. When the reproduced data is output to the host device, the encoding/decoding circuit 36 temporarily stores the reproduced data in buffer memory 38 before output.

Next, operation when data is recorded on the optical disc 10 is explained. When recording data on the optical disc 10, the data for recording supplied by the host device, is supplied to the encoding/decoding circuit 36 via the interface I/F 40. The encoding/decoding circuit 36 stores the data for recording in the buffer memory 38, and encodes and supplies the data for recording to the write strategy circuit 42. The write strategy circuit 42 converts the input data into multi-pulse signals according to a predetermined recording strategy, and supplies those as the recording data to the driver 22. The recording strategy determines, for example, the pulse width Tmp of the following pulse in a multi-pulse signal. Because the write strategy affects the recording quality, conventionally the write strategy is fixed at the optimum strategy. The write strategy may also be set during OPC (Optimum Power Control). Laser light power-modulated by the recording data is emitted from the LD of the optical pickup 16 to record data on the optical disc 10. Recording of this data is for example performed in packet units. After recording data in packet units, the optical pickup 16 emits laser light at the reproduction power to reproduce the recorded data, which is supplied to the RF circuit 26.

The RF circuit 26 supplies the reproduction signal to the binarizing circuit 34, and the binarized data is supplied to the encoding/decoding circuit 36. The encoding/decoding circuit 36 decodes the data, and compares the result with the recording data stored in the buffer memory 38. The result of the comparison is supplied to the system controller 32.

The system controller 32 controls the operation of each portion of the device; particularly in this embodiment, after executing OPC to select the optimum write power, the system controller 32 sets the target value in the APC 24 so as to attain this write power, and computes the correction coefficient for correcting the signal output from the front monitor PD at this optimum write power to be supplied to the APC 24. In the APC 24, feedback control of the LD laser optical power is performed based on the target value and correction coefficient supplied from the system controller 32.

Figure 2:
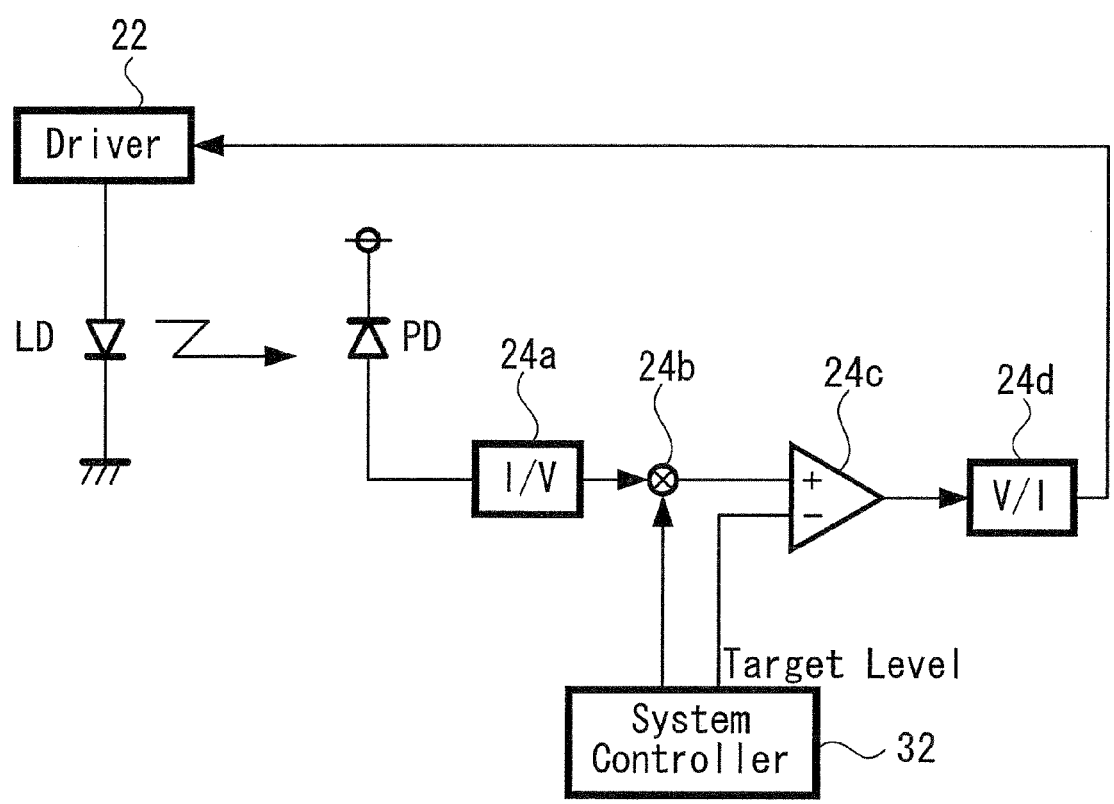
FIG. 2 is a diagram of the APC circuit configuration in FIG. 1.

FIG. 2 shows the circuit configuration of the APC 24 in FIG. 1. Laser light is received by the front monitor PD positioned near the LD, and a current is output corresponding to the laser light power. The detected current is supplied to a sampling circuit, not shown, in which only the signal in a predetermined period is sampled, after which the signal is supplied to the current-voltage converter I/V 24a. There are periods corresponding to the leading pulse or to the following pulse in a multi-pulse signal, but because in this embodiment an explanation is given of control of the write power for the following pulse in particular, sampling is taken to be executed in the period of the following pulse. The current-voltage converter I/V 24 converts the input current value into a voltage value, which is supplied via the multiplier 24b to the non-inverting input terminal (+) of the differential amplifier 24c. On the other hand, in the system controller 32 the correction coefficient Cp corresponding to the target write power is computed and is supplied to the multiplier 24b, while in addition the target level (target voltage value) corresponding to the write power is supplied to the inverting input terminal (−) of the differential amplifier 24c. The target voltage value is uniquely determined for a given write power, and is a value which does not take into account the time constants and similar of IC of the PD, or amplifier. In the amplifier 24b, the correction coefficient Cp from the system controller 32 is used to correct the signal voltage value from the front monitor PD and supply the result to the non-inverting input terminal (+) of the differential amplifier 24c. The differential amplifier 24c compares the corrected signal voltage value with the target voltage value, and supplies the difference to the voltage-current converter V/I 24d. The voltage-current converter V/I 24d supplies the current corresponding to this difference to the driver 22 to effect feedback control of the LD write power. In FIG. 2, an analog-digital converter A/D may be provided in the subsequent stage of the current-voltage converter I/V 24a, and a digital-analog converter D/A may be provided in the previous stage of the voltage-current converter V/I 24d.

Next, the processing of computing the correction coefficient Cp in the system controller 32 is explained. Suppose that the write power is Pw, the read power is Pr, and the pulse width of the following pulse is Tmp. Further, the ideal energy (per T) obtained from sampling using a sample pulse from the front monitor Pd is Ei, and the actual energy (per T) is Er; the explanation then focuses on cases in which Tmp=0.75T and Tmp=0.25T.

Figure 3:
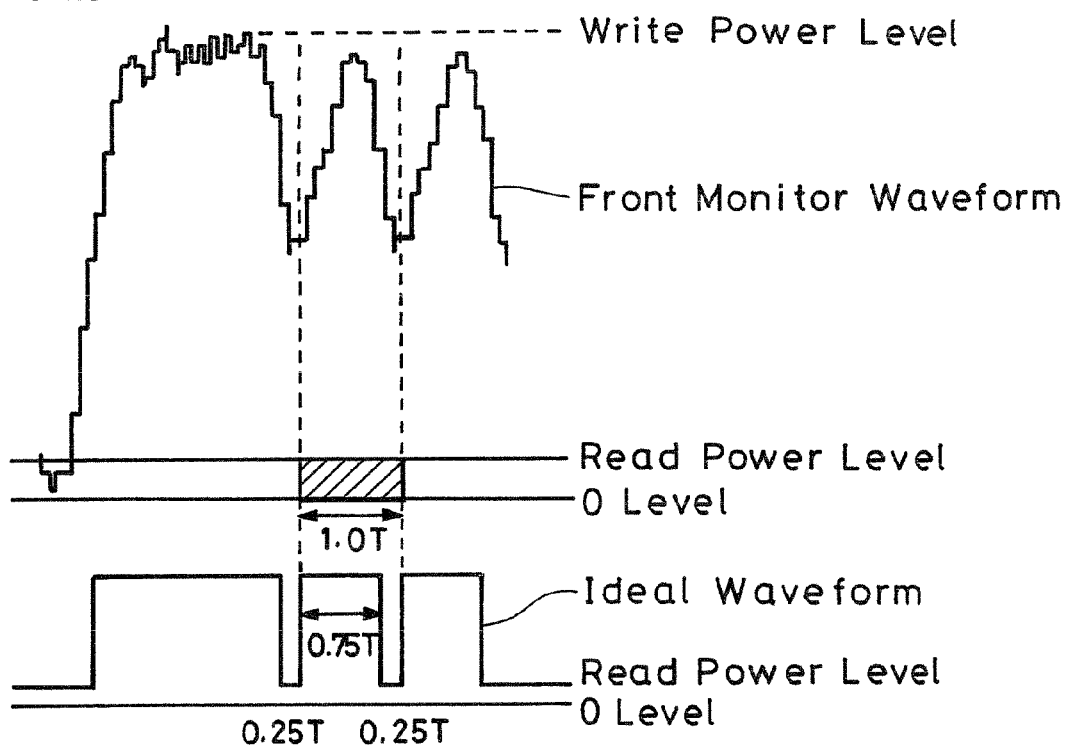
FIG. 3 is a drawing to explain the PD output waveform and ideal waveform when Tmp=0.75T.

FIG. 3 shows the output waveform from the front monitor Pd when Tmp=0.75T and the ideal waveform. When Tmp=0.75T, blunting of the waveform causes the leading pulse to have an effect, and the output waveform from the front monitor rises up to the write power level before falls into the read power level, so that a waveform results in which the write power level persists. Hence the energy resulting by subtracting the read power energy Erd (a constant) from the actual energy Er is increased to the extent that the write power increases.

It is assumed that the actual energy Er increases in proportion to the write power:

$$Er - Erd = \epsilon Pw \tag{2}$$

Here $\epsilon$ is the result of dividing the energy value by the power value, that is, the energy per unit power, and is a constant.

Figure 4:
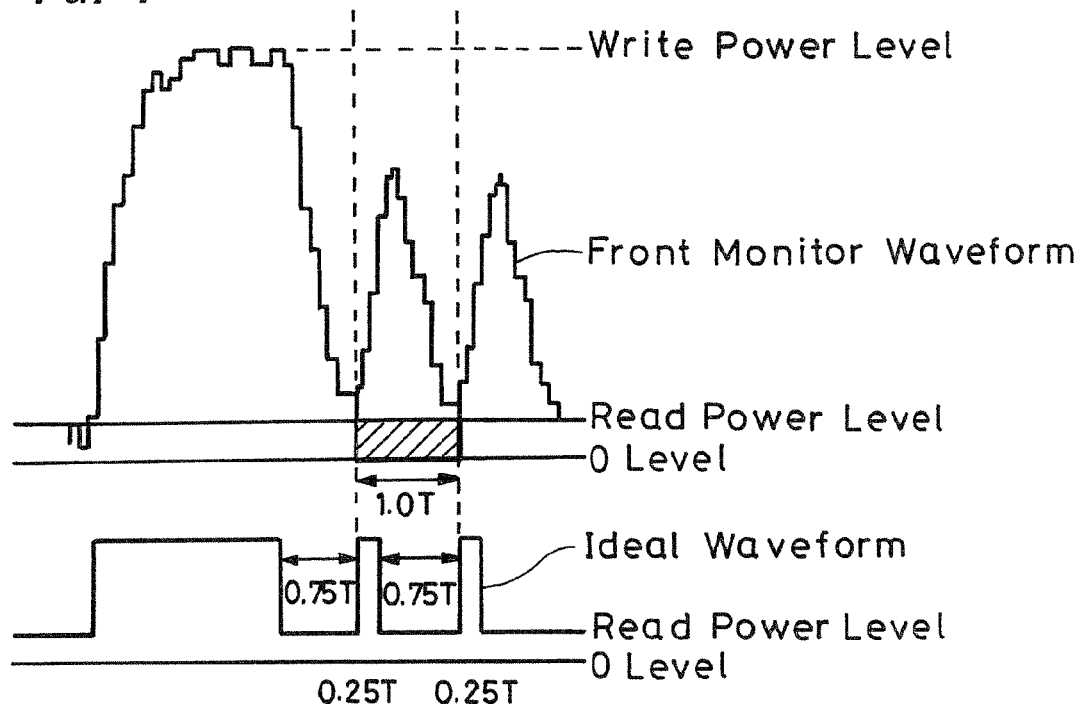
FIG. 4 is a drawing to explain the PD output waveform and ideal waveform when Tmp=0.25T.

FIG. 4 shows the output waveform from the front monitor Pd when Tmp=0.25T and the ideal waveform. When Tmp=0.25T, that means the pulse width is comparatively short, although there is blunting of the waveform, there is a 0.75T time interval between the leading pulse and the following pulse, so that the output waveform from the front monitor falls into the read power. Thereafter, because the pulse width Tmp is short the write power does not rise up to the write power level, and the level falls into the read power level to result in a peak-type waveform. This peak-type waveform does not change much even when the write power changes, nor does the energy change greatly, so that the actual energy Er can be assumed to be constant. That is:

$$Er = \text{constant} \tag{3}$$

A case in which the pulse width Tmp is equal to or greater than a predetermined value, having a waveform such as that shown in FIG. 3, is called a long mode, and a case in which the pulse width Tmp is shorter than the predetermined value, having a waveform such as that of FIG. 4 is called a short mode; if the actual energy for a long mode is Erl and the actual energy for a short mode is Ers, then equations (2) and (3) respectively become:

$$Erl - Erd = \epsilon Pw \tag{4}$$

$$Ers = \text{constant} \tag{5}$$

The correction coefficient Cpl in the case of a long mode in which Tmp=0.75T is:

$$\begin{aligned} Cpl &= K \cdot Erl / Eil \\ &= K \cdot (Erd + Erl - Erd) / Eil \\ &= K \cdot (Erd + \varepsilon Pw) / Eil \end{aligned} \tag{6}$$

Here Eil is the ideal energy for the long mode. In the case of a short mode for which Tmp=0.25T, the correction coefficient Cps is $$Cps = K \cdot Ers / Eis \tag{7}$$

Here Eis is the ideal energy for the short mode. The ideal energy Eil (per T) for the long mode with Tmp=0.75T, and the ideal energy Eis (per T) for the short mode with Tmp=0.25T, are as is clear from the ideal waveforms of FIG. 3 and FIG. 4, $$\begin{aligned} Eil &= 0.75T \cdot (Pw - Pr) + 1.0T \cdot Pr \\ &= 0.75T \cdot Pw + 0.25T \cdot Pr \end{aligned} \tag{8}$$

-continued $$EiS = 0.25T \cdot (Pw - Pr) + 1.0T \cdot Pr \quad (9)$$
$$= 0.25T \cdot Pw + 0.75T \cdot Pr$$

Cp is normalized to be 1 when Tmp=0.75T, so that, since Cpl results from substitution of 0.75T for Tmp in equation (1) and Cps similarly results from substitution of 0.25T for Tmp in equation (1), the relation between Cpl and Cps is $$Cpl/Cps = 1/\{1-(0.75\,T-0.25\,T)ap\} \quad (10)$$

Here ap is the slope of the correction coefficient at the write power Pw for Tmp.

These equations can be used to obtain $$1/\{1 - (0.75T - 0.25T)ap\} = Cpl/Cps \quad (11)$$

$$= \left\{ \begin{array}{c} K \cdot (Erd + \varepsilon Pw)/ \\ (0.75T \cdot Pw + 0.25T \cdot Pr) \end{array} \right\} / \\ \{K \cdot Ers/(0.25T \cdot Pw + 0.75T \cdot Pr)\}$$

$$= 1 \bigg/ Ers \left[ \frac{\left\{ \begin{array}{c} 0.25T \cdot \varepsilon Pw2 + \\ \left( \begin{array}{c} 0.25T \cdot Erd + \\ 0.75T \cdot \varepsilon Pw \end{array} \right) Pw + \\ 0.75T \cdot Erd \cdot Pr \end{array} \right\}}{(0.75T \cdot Pw + 0.25T \cdot Pr)} \right]$$

In this equation, the read power Pr, clock period T for writing, and detected energy (per T) Erd in the front monitor PD for the read power are known constants, and the proportionality coefficient ε of the write power Pw to the detected energy in the front monitor when the pulse width Tmp is a predetermined value (for example, 0.40T) or greater as well as the detected energy Ers in the front monitor Pd when the pulse width Tmp is shorter than the predetermined value are unknown constants; and ap is a function of Pw. Taking as variables $$\chi 1 = Pw2/(0.75Pw + 0.25Pr) \quad (12)$$

$$\chi 2 = Pw/(0.75Pw + 0.25Pr) \quad (13)$$

$$\chi 3 = 1/(0.75Pw + 0.25Pr) \quad (14)$$

and taking as parameters $$\alpha = 0.25\varepsilon/Ers \quad (15)$$

$$\beta = (0.25Erd + 0.75\varepsilon Pr)/r \quad (16)$$

$$\chi = 0.75Erd \cdot Pr/Ers \quad (17)$$

and expressing equation (11) in a matrix form, $$1/(1 - 0.5T \cdot ap) = [\chi 1 \; \chi 2 \; \chi 3] \begin{bmatrix} \alpha \\ \beta \\ \chi \end{bmatrix} \quad (18)$$

is obtained. The parameters α, β, χ, including the unknown constants ε and Ers, must be determined. Because equation (18) is linear with respect to the parameters (α, β, χ), a number of data points for ap with respect to Pw can be measured, and polynomial fitting using a linear least-squares approximation is performed to calculate the parameters (α, β, χ). For example, five data points for ap as a function of Pw can be measured, and polynomial fitting is performed. The following table shows five measured values and the values of χ1, χ2, χ3 determined from these.

TABLE 1

| Pw | χ1 | χ2 | χ3 | ap |
|---|---|---|---|---|
| 5.0 | 6.369 | 1.274 | 0.255 | 0.506 |
| 8.0 | 10.364 | 1.296 | 0.162 | 0.668 |
| 10.0 | 13.029 | 1.303 | 0.130 | 0.723 |
| 12.0 | 15.695 | 1.308 | 0.109 | 0.768 |
| 15.0 | 19.694 | 1.313 | 0.088 | 0.632 |

Figure 5:
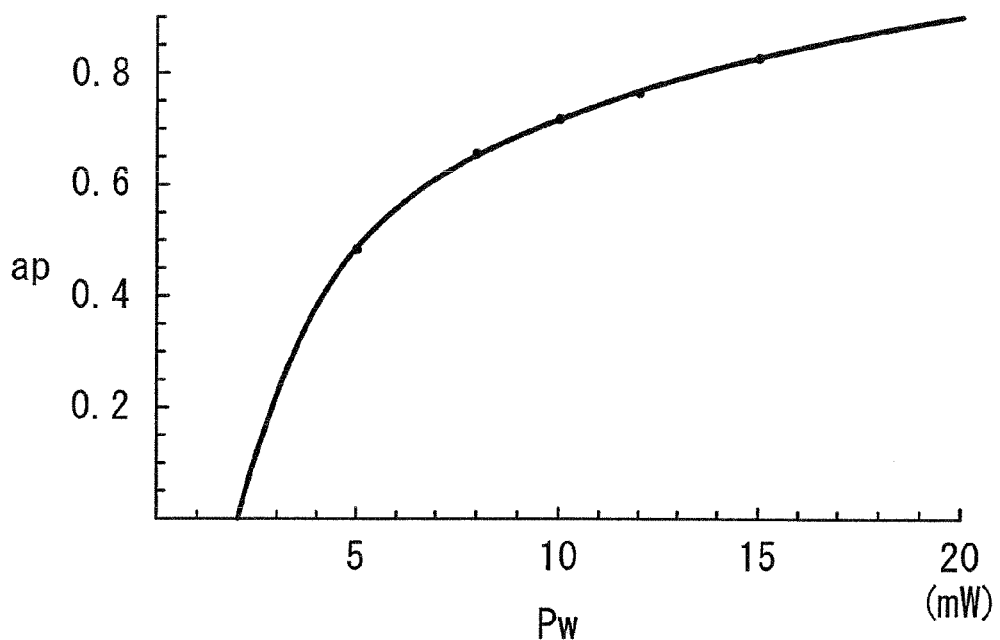
FIG. 5 is a graph showing the approximating equation of the embodiment.
Figure 6:
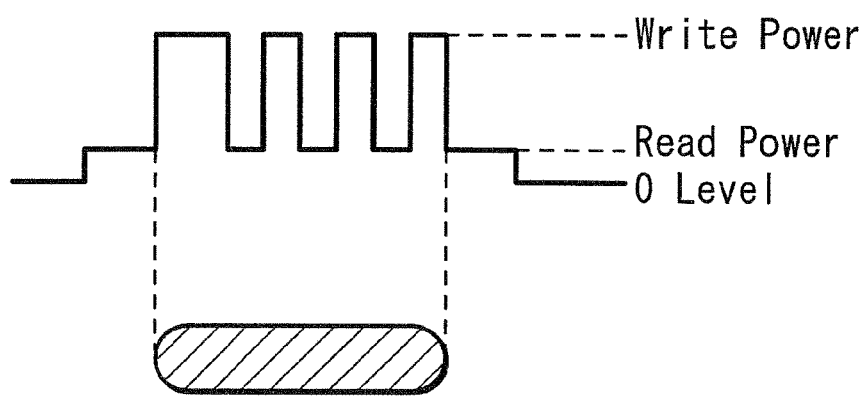
FIG. 6 is a drawing to explain the relation between multi-pulse signals and pits.
Figure 7:
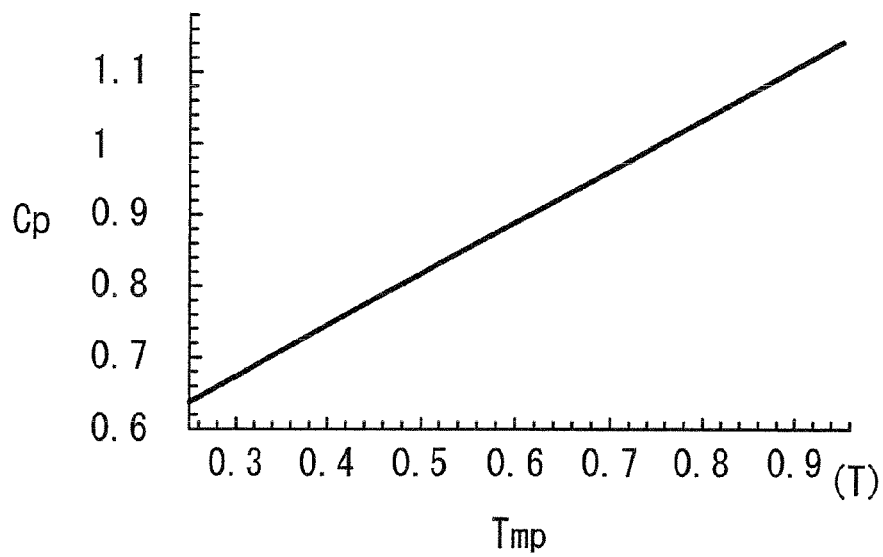
FIG. 7 is a graph showing the relation between the pulse width Tmp and correction coefficient Cp.
Figure 8:
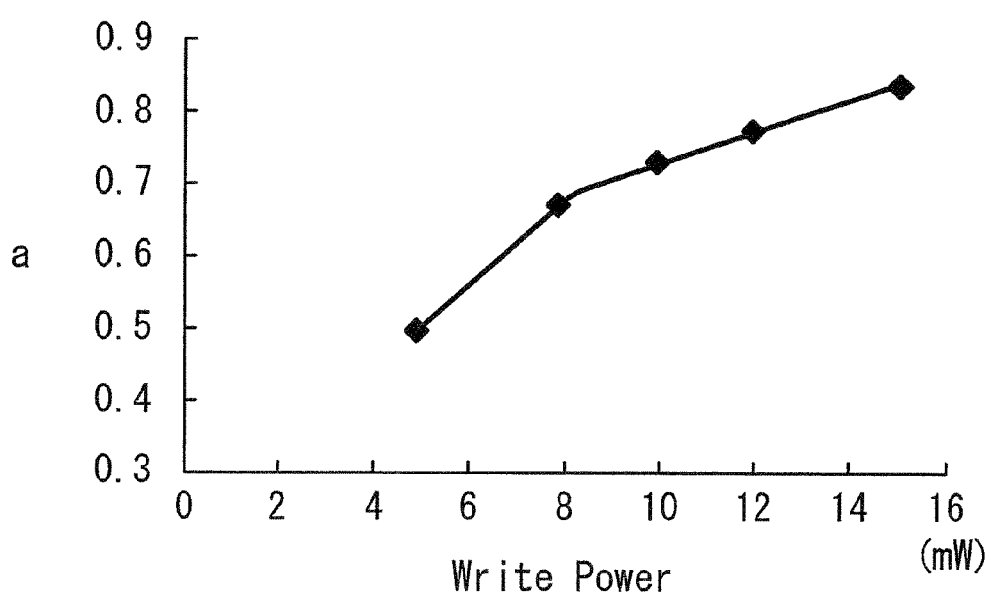
FIG. 8 is a graph showing the relation between the write power and the slope a of the correction coefficient.

On performing polynomial fitting using the least-squares method of the data in Table 1,

α=0.01455
β=1.13619
χ=−0.78512 are obtained. Upon using those results to plot an approximating equation for ap, the result shown in FIG. 5 is obtained. In FIG. 5, the filled circles are the measured values shown in Table 1. The approximating equation obtained as described above is a nonlinear curve which closely approximates the measured results, and by using this approximating equation the slope ap of the correction coefficient at an arbitrary write power Pw can be computed with high accuracy. In this embodiment, as explained above, by taking the read power Pr, clock period T for writing, and detected energy (per T) Erd in the front monitor PD for the read power as known values, and by taking the proportionality coefficient ε of the write power Pw to the detected energy in the front monitor when the pulse width Tmp is a predetermined value (for example, 0.40T) or greater as well as the detected energy Ers in the front monitor Pd when the pulse width Tmp is shorter than the predetermined value to be unknown constants, the approximating equation can be easily calculated. In this case, an appropriate value determined from experiment may be used as the predetermined value to discriminate long modes and short modes; however, a predetermined value in the vicinity of Tmp=0.40T used in this embodiment is appropriate. This value may also be determined for each optical disc device.

The system controller 32 stores the approximating equation shown in FIG. 5 in memory, and uses this approximating equation to compute the slope a (ap in this embodiment) of the correction coefficient at the target write power Pw; then, using this slope a, the correction coefficient Cp is computed from equation (1) and is supplied to the multiplier 24b of the APC 24. Accordingly, the multiplier 24b performs correction which takes into account the blunting of the waveform, the differential amplifier 24c computes the difference between the corrected PD signal output and the target value, the error is computed, and feedback control of the driver 22 is performed. The system controller 32 does not store the slope a or correction coefficient Cp corresponding to the write power in memory as a table, but stores the approximating equation, and using this approximating equation computes the slope a and the correction coefficient Cp; hence a large number of data items need not be measured, and the LD laser light power can be adjusted accurately employing only small memory capacity.

In this embodiment, five measurement points were used to calculate the approximating equation; but more than five points, or fewer than five points, may be used as necessary. However, if too few measurement points are used the accuracy of the approximating equation is diminished, and so it is desirable that in addition to measurement points at the smallest power and the greatest power which can be used as write powers, measurements at two or three other points be performed to calculate the approximating equation. Calculation of the approximating equation may also be performed at the time of OPC processing. That is, in OPC processing the system controller 32 measures the necessary number (for example, five) of Pw and a values, and based on the measured values calculates the approximating equation. Calculation of the approximating equation may be performed at the time of factory shipment of the optical disc device, with the result being stored in the memory of the system controller 32.

In this embodiment, the signal level from the front monitor PD is corrected using a calculated correction coefficient; but the target value supplied from the system controller 32 may itself be corrected. The target value and signal level are compared by the differential amplifier 24c, and so whether the signal level or the target value is corrected can be set arbitrarily.

As explained above, according to this invention, an approximating equation is used in feedback control to correct the recording power monitor output so as to coincide with a target power; consequently the recording power can be adjusted accurately employing small memory capacity.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A semiconductor laser driving device, having
light-receiving means to detect recording laser light from a semiconductor laser and
control means to compare a signal from said light-receiving means with a target value and control driving of said semiconductor laser so as to coincide with said target value, wherein
said semiconductor laser driving device further comprises correction means to correct the signal level from said light-receiving means; said correction means performs correction by multiplying the signal level from said light-receiving means or said target value by a correction coefficient; and said correction coefficient is calculated from an approximating equation according to the target recording power.

2. The semiconductor laser driving device according to claim 1, wherein said correction coefficient is substantially proportional to the pulse width when said recording laser light is formed as a pulse train, and said approximating equation specifies in non-linear form the proportionality constant for said target recording power.

3. The semiconductor laser driving device according to claim 2, wherein said recording laser light is superposed in reproduction laser light;
said approximating equation takes as known constants the reproduction power of said reproduction laser light and the detected energy when said reproduction laser light is received by said light-receiving means; and
the detected energy when said light-receiving means receives said recording laser light where said pulse width is smaller than a predetermined value and the constant of proportionality to the recording power of the detected energy when said light-receiving means receives said recording laser light where said pulse width is equal to or greater than the predetermined value are taken to be constant values.

4. An optical disc device, comprising the semiconductor laser driving device according to claim 1.

5. An optical disc device, comprising the semiconductor laser driving device according to claim 2.

6. An optical disc device, comprising the semiconductor laser driving device according to claim 3.

* * * * *